(12) United States Patent
Fujii et al.

(10) Patent No.: US 9,249,033 B2
(45) Date of Patent: Feb. 2, 2016

(54) FERRITE PARTICLES FOR BONDED MAGNETS, RESIN COMPOSITION FOR BONDED MAGNETS, AND MOLDED PRODUCT COMPRISING THE SAME

(75) Inventors: Yasuhiko Fujii, Hiroshima-ken (JP); Yasushi Nishio, Hiroshima-ken (JP); Kazuhisa Kanefuji, Hiroshima-ken (JP); Tatsuya Ishida, Hiroshima-ken (JP); Shigeru Takaragi, Hiroshima-ken (JP)

(73) Assignee: TODA KOGYO CORPORATION, Hiroshima (JP)

( * ) Notice: Subject to any disclaimer, the term of this patent is extended or adjusted under 35 U.S.C. 154(b) by 0 days.

(21) Appl. No.: 12/530,963

(22) PCT Filed: Mar. 14, 2008

(86) PCT No.: PCT/JP2008/000594
§ 371 (c)(1),
(2), (4) Date: Jan. 4, 2010

(87) PCT Pub. No.: WO2008/126352
PCT Pub. Date: Oct. 23, 2008

(65) Prior Publication Data
US 2010/0108935 A1    May 6, 2010

(30) Foreign Application Priority Data

Mar. 14, 2007 (JP) .................................. 2007-065563

(51) Int. Cl.
| H01F 1/113 | (2006.01) |
| C09C 1/24 | (2006.01) |
| C01G 49/00 | (2006.01) |
| C04B 35/26 | (2006.01) |

(52) U.S. Cl.
CPC ........ *C01G 49/0036* (2013.01); *C04B 35/2683* (2013.01); *C09C 1/24* (2013.01); *H01F 1/113* (2013.01); *C01P 2004/61* (2013.01); *C01P 2006/12* (2013.01); *C01P 2006/42* (2013.01); *C04B 2235/3201* (2013.01); *C04B 2235/3206* (2013.01); *C04B 2235/3208* (2013.01); *C04B 2235/3213* (2013.01); *C04B 2235/3215* (2013.01); *C04B 2235/3409* (2013.01); *C04B 2235/3418* (2013.01); *C04B 2235/444* (2013.01); *C04B 2235/447* (2013.01); *C04B 2235/5409* (2013.01); *C04B 2235/5436* (2013.01); *C04B 2235/604* (2013.01)

(58) Field of Classification Search
CPC .................................. H01F 1/113; C09C 1/24
USPC .................................. 252/62.54, 62.63, 62.65
See application file for complete search history.

(56) References Cited

U.S. PATENT DOCUMENTS

| 3,003,965 | A | * | 10/1961 | van Laar ..................... 252/62.54 |
| 3,597,357 | A | * | 8/1971 | Cochardt ................... 252/62.63 |
| 4,497,722 | A | * | 2/1985 | Tsuchida et al. ........... 252/62.54 |
| 4,988,755 | A | * | 1/1991 | Dickens et al. ............... 524/401 |
| 5,063,011 | A | * | 11/1991 | Rutz et al. ..................... 264/126 |
| 5,646,229 | A | * | 7/1997 | Kudo ............................. 528/53 |
| 5,885,740 | A | * | 3/1999 | Tokunaga et al. ........ 430/111.31 |
| 6,787,059 | B2 | * | 9/2004 | Takaragi et al. ........... 252/62.54 |
| 6,926,963 | B2 | * | 8/2005 | Ohmori et al. ................ 428/403 |
| 2004/0013951 | A1 | * | 1/2004 | Wang ................................ 430/5 |
| 2007/0023970 | A1 | * | 2/2007 | Masuzawa et al. ........... 264/429 |

FOREIGN PATENT DOCUMENTS

| JP | 63043964 | A | * | 2/1988 |
| JP | 01007604 | A | * | 1/1989 |
| JP | 03136215 | A | * | 6/1991 |
| JP | 2003-142307 | | | 5/2003 |
| JP | 2003-282313 | | | 10/2003 |
| JP | 2005-005597 | | | 1/2005 |
| JP | 2005263619 | A | * | 9/2005 |
| JP | 2006245173 | A | * | 9/2006 |
| JP | 2007250646 | A | * | 9/2007 |

OTHER PUBLICATIONS

Derwent Abstract of JP 03136215A (AN 1991-212652), Jun. 1991.*
CAPlus (AN 1988:474576) of JP 63-043964A.*
Machine translated English equivalent of JP 2005263619A, 2005, 18 pages.*
Derwent Abstract of JP 01-007604 (AN 1989-056523), Jan. 1989.*
Nordmann (Super Ester A-100, 2009, 2 pages).*
Machine translated English equivalent of JP 2007-250646 (Sep. 2007, 22 pages).*
Machine translated English equivalent of JP 2006-245173 (Sep. 2006, 40 pages).*
International Search Report for PCT/JP2008/000594, mailed Jun. 17, 2008.

(Continued)

*Primary Examiner* — Brieann R Fink
(74) *Attorney, Agent, or Firm* — Nixon & Vanderhye P.C.

(57) ABSTRACT

The present invention relates to ferrite particles for bonded magnets and a resin composition for bonded magnets which exhibit a good moldability, in particular, a good mechanical strength even when rapidly quenched upon injection-cooling, and is capable of producing a bonded magnet molded product having excellent magnetic properties, as well as a bonded magnet molded product such as a magnet roll using the ferrite particles and the resin composition. There are provided ferrite particles for bonded magnets which comprise phosphorus adsorbed and/or incorporated in ferrite, in which a content of the phosphorus in the ferrite is 120 to 5000 mg/kg (0.012 to 0.50% by weight) in terms of P; a resin composition for bonded magnets; and a magnet roll.

9 Claims, No Drawings

(56) References Cited

OTHER PUBLICATIONS

English translation of JP 2003-142307 (May 16, 2003).
Extended European Search Report in EP 08 72 0480 mailed Nov. 29, 2011.
Database WPI, Week 199219, Thomson Scientific, London, GB; AN 1992-155320; XP002664052, & JP 4 093002 A (Kawasaki Steel Corp) Mar. 25, 1992, abstract.
Database WPI, Week 200377, Thomson Scientific, London, GB; AN 2003-818125, XP002664053, & JP 2003 142307 A (Sumitomo Metal Mining Co) May 16, 2003, abstract.
Database WPI, Week 198724, Thomson Scientific, London, GB; AN 1987-167782, XP002664054, & JP 62 101003 A (Bridgestone Tire KK), May 11, 1987, abstract.
Database WPI, Week 200458, Thomson Scientific, London, GB; AN 2004-604120, XP002664055, & WO 2004/065306 A1 (Hitachi Maxell KK), Aug. 5, 2004, abstract.
English translation of Notice of Reasons for Rejection in JP 2007-065563 issued Mar. 23, 2011.
English translation of Notice of Reasons for Rejection in JP 2008-097517 issued Jul. 11, 2011.

\* cited by examiner

FERRITE PARTICLES FOR BONDED MAGNETS, RESIN COMPOSITION FOR BONDED MAGNETS, AND MOLDED PRODUCT COMPRISING THE SAME

This application is the U.S. national phase of International Application No. PCT/JP2008/000594 filed 14 Mar. 2008, which designated the U.S. and claims priority to JP Application No. 2007-065563 filed 14 Mar. 2007, the entire contents of each of which are hereby incorporated by reference.

TECHNICAL FIELD

The present invention relates to ferrite particles for bonded magnets and a resin composition for bonded magnets which exhibit a good moldability, in particular, a good mechanical strength even when rapidly quenched upon injection-cooling, and is capable of producing a bonded magnet molded product having excellent magnetic properties, as well as a bonded magnet molded product such as a magnet roll using the ferrite particles and the resin composition.

BACKGROUND ART

As well known in the art, bonded magnets have many advantages such as light weight, good dimensional accuracy, and facilitated mass-production of molded products having even a complicated shape as compared to sintered magnets, and, therefore, have been extensively used in various applications such as toys, office equipments, audio equipments and motors.

As the magnetic particles usable in the bonded magnets, there are known rare earth element magnet particles such as typically Nd—Fe—B-based alloy particles, or ferrite particles. The rare earth element magnet particles have high magnetic properties, but are expensive, resulting in limited applications thereof. On the other hand, the ferrite particles are somewhat deteriorated in magnetic properties as compared to the rare earth element magnet particles, but are inexpensive and chemically stable and, therefore, have been used in more extensive applications.

The bonded magnets have been usually produced by kneading a rubber or plastic material with magnetic particles and then molding the resultant kneaded material in a magnetic field or by using a mechanical means.

In recent years, with the increase in performance of various materials or equipments including an improved productivity and an enhanced reliability upon use, there is also an increasing demand for a high performance of bonded magnets used therein including improvement in productivity as well as enhancement in mechanical strength and magnetic properties of the bonded magnets.

More specifically, upon production of the bonded magnets by injection-molding, etc., in order to not only improve general characteristics but also enhance a production efficiency thereof by increasing an injection frequency per unit time, in other words, in order to enhance the productivity, it is required to rapidly cooling the resulting molded product immediately after the injection-molding. Therefore, it is necessary to use a material having an excellent quenching resistance for production of bonded magnets such that the rapid cooling has no adverse influence on strength of the obtained bonded magnets. Further, the resulting bonded magnets are also required to exhibit a good mechanical strength capable of withstanding severe conditions when used in various applications.

For example, in copying machines, printers or the like using a magnet roll, since the magnet roll is used at a high speed in these equipments with a long service life, it has been strongly required that the magnet roll exhibits a high mechanical strength. In addition, as to the magnetic properties of the magnet roll, it has been especially required to achieve not only increase in a surface magnetic force of the magnet roll, but also uniformity in the surface magnetic force as important technical factors for obtaining clear images in the copying machines, printers, etc.

For this reason, ferrite particles used in the bonded magnets as well as resin compositions for the bonded magnets which comprise the ferrite particles and an organic binder are also required to satisfy the above requirements.

Conventionally, ferrite particles for bonded magnets and resin compositions for bonded magnets comprising the ferrite particles and the organic binder have been improved variously. For example, there are known the method of producing ferrite particles by using an alkali metal compound or an alkali earth metal compound as a flux (Patent Document 1); the method of treating ferrite particles with an acid and then treating the surface of the thus acid-treated ferrite particles with a phosphate-based coupling agent (Patent Document 2); the method of treating the surface of ferrite particles with a phosphoric acid compound (Patent Document 3); the method of treating ferrite particles with an alkali and then treating the thus alkali-treated ferrite particles with a coupling agent (Patent Document 4); the method of controlling a particle size distribution of ferrite particles (Patent Document 5); the method of producing a bonded magnet using ferrite magnetic particles comprising an alkali earth metal as a constituting component and having an average particle diameter of not less than 1.50 μm and a melt flow rate of not less than 91 g/10 min (Patent Document 6); or the like.

Patent Document 1: Japanese Patent Application Laid-Open (KOKAI) No. 55-145303
Patent Document 2: Japanese Patent Application Laid-Open (KOKAI) No. 4-93002
Patent Document 3: Japanese Patent Application Laid-Open (KOKAI) No. 2007-281381
Patent Document 4: Japanese Patent Application Laid-Open (KOKAI) No. 5-41314
Patent Document 5: Japanese Patent Application Laid-Open (KOKAI) No. 3-218606
Patent Document 6: Japanese Patent Application Laid-Open (KOKAI) No. 2005-268729

DISCLOSURE OF THE INVENTION

Problem to be Solved by the Invention

At the present time, the ferrite particles for bonded magnet and/or the resin compositions for bonded magnet which are capable of satisfying the above requirements have been strongly required. However, the ferrite particles and/or resin compositions capable of satisfying the above requirements to a sufficient extent have not been obtained until now.

That is, the bonded magnet molded products produced by using the ferrite particles or resin compositions for bonded magnet as described in the above Patent Documents 1, 2, 4, 5 and 6 have failed to provide those which are excellent in all of high magnetic force, uniformity in magnetic force and excellent magnetic strength.

In Patent Document 3, there is described the technique of improving a mechanical strength of a bonded magnet molded product, for example, by treating the surface of ferrite particles for bonded magnets in which phosphorus is adsorbed and/or incorporated, with a phosphoric acid compound. In the technique as described in Patent Document 3, although the molded product is improved in mechanical strength, the phosphoric acid compound mentioned therein tends to be dissociated in a solution in the course of the surface treatment, so that the resulting phosphoric acid compound ions tend to be substantially reacted as an acid in the solution. Therefore, when the molding is conducted at a temperature of 200 to 400° C., the resulting molded product tends to suffer from formation of voids owing to decomposed products or water vapor produced by decomposition and/or intramolecular dehydration of the phosphoric acid compound, thereby causing deterioration in properties of the molded product. However, the Patent Document 3 fails to take the above problem into consideration.

In consequence, an object or a technical task of the present invention is to provide ferrite particles for bonded magnet and a resin composition for bonded magnet which are capable of producing a bonded magnet exhibiting a high magnetic force, a good uniformity in magnetic force and an excellent mechanical strength.

Means for Solving the Problem

As a result of the present inventors' earnest study for solving the above problems, it has been found that the ferrite particles for bonded magnets in which phosphorus is adsorbed and/or a specific amount of phosphorus is incorporated can maintain not only a good surface property compatible with an organic binder and/or a silane coupling agent, but also can provide magnetic particles having an excellent dispersibility and, therefore, are suitable as magnetic particles for bonded magnets; and that when using ferrite particles for bonded magnets which comprise a phosphoric acid compound that is free from decomposition and/or intramolecular dehydration at a molding temperature of 200 to 400° C., the resulting molded product can be prevented from suffering from formation of voids that will cause unevenness of magnetic force and deterioration in mechanical strength. The present invention has been attained based on the above findings.

That is, according to the present invention, there are provided ferrite particles for bonded magnets, comprising phosphorus adsorbed and/or incorporated in ferrite, a content of the phosphorus in the ferrite being 120 to 5000 mg/kg (0.012 to 0.50% by weight) in terms of P (Invention 1).

Also, according to the present invention, there are provided ferrite particles for bonded magnet as described in Invention 1, wherein a phosphoric acid compound that is free from decomposition and/or intramolecular dehydration at a temperature of 200 to 400° C. is used as the phosphorus (Invention 2).

Further, according to the present invention, there is provided a resin composition for bonded magnet, comprising an organic binder component and ferrite particles for bonded magnets, a content of the ferrite particles in the resin composition for bonded magnets being 70 to 95% by weight based on the weight of the resin composition, and a content of phosphorus in the resin composition being 100 to 4000 mg/kg (0.010 to 0.40% by weight) in terms of P (Invention 3).

Also, according to the present invention, there is provided a resin composition for bonded magnets as described in Invention 3, wherein a phosphoric acid compound that is free from decomposition and/or intramolecular dehydration at a temperature of 200 to 400° C. is used as the phosphorus (Invention 4).

In addition, according to the present invention, there is provided a resin composition for bonded magnet, comprising an organic binder component, ferrite particles for bonded magnets, and a silane coupling agent, a content of the ferrite particles in the resin composition for bonded magnets being 70 to 95% by weight based on the weight of the resin composition;

a content of phosphorus in the resin composition being 100 to 4000 mg/kg (0.010 to 0.40% by weight) in terms of P; and a content of silicon in the resin composition being 1000 to 10000 mg/kg (0.10 to 1.0% by weight) in terms of $SiO_2$ (Invention 5).

Also, according to the present invention, there is provided a resin composition for bonded magnets as described in Invention 5, wherein a phosphoric acid compound that is free from decomposition and/or intramolecular dehydration at a temperature of 200 to 400° C. is used as the phosphorus (Invention 6).

Also, according to the present invention, there is provided a resin composition for bonded magnets as described in any one of Inventions 3 to 6, wherein the organic binder component is a polyamide resin (Invention 7).

Further, according to the present invention, there is provided a molded product comprising the ferrite particles for bonded magnets as described in Invention 1 or 2, or the resin composition for bonded magnets as described in any one of Inventions 3 to 7 (Invention 8).

Also, according to the present invention, there is provided a molded product as described in Invention 8, wherein the molded product is a magnet roll (Invention 9).

Effect of the Invention

The ferrite particles for bonded magnets according to the present invention comprise phosphorus in an amount of 120 to 5000 mg/kg in terms of P, and a part or whole of the phosphorus is chemically adsorbed in or chemically bonded to the ferrite particles in the form of phosphate ions, pyrophosphate ions or metaphosphate ions. The ferrite particles are magnetic particles having not only a good surface property compatible with an organic binder and/or a silane coupling agent but also an excellent dispersibility, and, therefore, are suitable as magnetic particles for bonded magnets.

The resin composition for bonded magnets according to the present invention comprises the ferrite particles for bonded magnets, an organic binder, a silane coupling agent, phosphorus, etc., is capable of producing a molded product having excellent quenching resistance and magnetic properties and, therefore, is suitable as a resin composition for bonded magnets.

The magnet roll according to the present invention is excellent in mechanical strength and uniformity of surface magnetic force and exhibits a high surface magnetic force and, therefore, is suitable as a magnet roll for printers, copying machines, etc.

The magnet roll according to the present invention is excellent in mechanical strength and uniformity of surface magnetic force, and exhibits a high surface magnetic force and a less number of voids formed therein, and, therefore, is suitable as a magnet roll for printers, copying machines, etc.

PREFERRED EMBODIMENTS OF THE INVENTION

The present invention is described in detail below.

First, the ferrite particles for bonded magnet according to the present invention (hereinafter referred to merely as "ferrite particles") are explained.

The composition of the ferrite particles according to the present invention is not particularly limited, and may be either Sr-based ferrite particles, Ba-based ferrite particles or a mixture thereof. In addition, the ferrite particles may also comprise different kinds of elements such as La, Nd, Pr, Co and Zn. Also, the ferrite particles may be either isotropic ferrite or anisotropic ferrite. However, in view of increasing a magnetic force on the surface of the molded product such as a magnet roll, anisotropic ferrite is preferably used.

Various phosphorus compounds may be used as the phosphorus to be adsorbed and/or incorporated in the ferrite particles for bonded magnets. Among these phosphorus compounds, preferred are phosphoric acids such as phosphoric acid (orthophosphoric acid), pyrophosphoric acid and metaphosphoric acid; and/or phosphoric acid compounds in the form of a salt of these phosphoric acids. In particular, phosphoric acids such as pyrophosphoric acid and metaphosphoric acid which are free from decomposition and/or intramolecular dehydration at a temperature of 200 to 400° C., and salts of these phosphoric acids, are more preferred.

The content of phosphorus in the ferrite particles according to the present invention is 120 to 5000 mg/kg (0.012 to 0.50% by weight). When the phosphorus content is less than 120 mg/kg, the molded product obtained by subjecting a kneaded material comprising the ferrite particles and an organic binder to injection-molding tends to be insufficient in mechanical strength and magnetic properties such as uniformity of surface magnetic force. When the phosphorus content is more than 5000 mg/kg, it may be difficult to obtain a good molded product having a sufficient mechanical strength therefrom. The content of phosphorus in the ferrite particles is preferably 140 to 4000 mg/kg and more preferably 150 to 3000 mg/kg.

The average particle diameter of the ferrite particles according to the present invention is not particularly limited, and is preferably 1.0 to 3.0 μm. When the average particle diameter of the ferrite particles is out of the above-specified range of 1.0 to 3.0 μm, the ferrite particles tend to be hardly packed with a high density when being formed into a bonded magnet, so that it may be difficult to produce a bonded magnet having high magnetic properties. The average particle diameter of the ferrite particles is more preferably 1.0 to 2.5 μm and still more preferably 1.0 to 2.0 μm.

The BET specific surface area value of the ferrite particles according to the present invention is not particularly limited, and is preferably 1.0 to 3.0 m$^2$/g and more preferably 1.0 to 2.5 m$^2$/g.

The compressed density (CD) of the ferrite particles according to the present invention is not particularly limited, and is preferably 3000 to 3500 kg/m$^3$ (3.00 to 3.50 g/cm$^3$). When the compressed density of the ferrite particles is less than 3000 kg/m$^3$ (3.00 g/cm$^3$), the filling (packing) property of the ferrite particles tends to be lowered, thereby failing to obtain a bonded magnet capable of exhibiting high magnetic properties. When the compressed density of the ferrite particles is more than 3500 kg/m$^3$ (3.50 g/cm$^3$), it may be difficult to produce a bonded magnet therefrom in an industrial stable manner although the resulting molded product is satisfactory in magnetic properties, etc. The compressed density of the ferrite particles is more preferably 3100 to 3500 kg/m$^3$ (3.10 to 3.50 g/cm$^3$) and still more preferably 3200 to 3450 kg/m$^3$ (3.20 to 3.45 g/cm$^3$).

The saturation magnetization value σs of the ferrite particles according to the present invention is preferably 65.0 to 73.0 Am$^2$/kg (65.0 to 73.0 emu/g), and the coercive force Hc of the ferrite particles is preferably 135 to 279 kA/m (1700 to 3500 Oe) although it is not particularly limited thereto.

Next, the process for producing the ferrite particles according to the present invention is described.

The ferrite particles according to the present invention may be produced by adding and mixing a phosphoric acid compound such as phosphoric acid (orthophosphoric acid), pyrophosphoric acid and metaphosphoric acid to magnetoplumbite-type ferrite particles as a precursor.

The magnetoplumbite-type ferrite particles as the precursor may be a commercially available product or those which are produced by blending and mixing raw material particles at a predetermined mixing ratio; calcining the resultant mixed raw material particles at a temperature of 900 to 1250° C. in atmospheric air, followed by pulverization and washing with water; and then subjecting the resultant particles to annealing heat treatment at a temperature of 700 to 1100° C. in atmospheric air. These ferrite particles may be used singly or in combination thereof.

The raw material particles may be appropriately selected from particles of oxides, hydroxides, carbonates, nitrates, sulfates, chlorides, etc., of various metals which are capable of forming a magnetoplumbite-type ferrite. Meanwhile, from the standpoint of improving a reactivity of the raw material particles upon calcining, the particle diameter of the raw material particles is preferably not more than 2.0 μm.

In addition, in the present invention, the mixed raw material particles are preferably calcined by adding a flux thereto. As the flux, there may be used various fluxes. Examples of the flux include $SrCl_2 \cdot 2H_2O$, $CaCl_2 \cdot 2H_2O$, $MgCl_2$, KCl, NaCl, $BaCl_2 \cdot 2H_2O$ and $Na_2B_4O_7$. The amount of the respective fluxes added is preferably 0.1 to 10 parts by weight and more preferably 0.2 to 8.0 parts by weight on the basis of 100 parts by weight of the mixed raw material particles.

Also, in the present invention, $Bi_2O_3$ may be added to and mixed in the mixed raw material particles or the particles obtained by calcining and then pulverizing the raw material particles.

Meanwhile, in the present invention, from the standpoint of well controlling the particle size distribution, two or more kinds of the ferrite particles which are different in particle diameter from each other may be used in combination thereof.

Examples of the phosphoric acid used in the present invention include phosphoric acid compounds such as orthophosphoric acid, pyrophosphoric acid and metaphosphoric acid; phosphoric acid salt compounds such as sodium pyrophosphate, sodium metaphosphate, potassium metaphosphate and sodium hexametaphosphate; triphosphoric acid; and tetraphosphoric acid. In particular, in view of suppressing formation of voids in a molded product such as a magnet roll, phosphoric acid compounds which are free from decomposition and/or intramolecular dehydration at a temperature of 200 to 400° C. (for example, phosphoric acid compounds such as pyrophosphoric acid and metaphosphoric acid or salts thereof) are preferred.

The amount of the phosphoric acid added is 0.012 to 1.5 parts by weight in terms of $H_3PO_4$ (orthophosphoric acid) based on 100 parts by weight of the ferrite particles. When the amount of the phosphoric acid added is out of the above-specified range, it is not possible to obtain the ferrite particles as aimed by the present invention.

Meanwhile, in some cases, the ferrite particles tend to comprise phosphorus as an impurity inevitably incorporated therein due to the raw materials and industrial water used upon production of the ferrite particles in an amount of about 80 to 90 mg/kg in terms of P. In this case, it is important to adjust the content of P in the ferrite particles which includes such an impurity component to not less than 120 mg/kg in order to achieve the present invention.

The magnetoplumbite-type ferrite particles as the precursor and the phosphoric acid compound may be mixed with each other by ordinary methods. The mixing method may be either a dry method or a wet method. In view of a less burden on the subsequent steps, the dry mixing method is preferred because no specific drying step is needed. The dry mixing may be carried out by either batch treatment or continuous treatment although it is not particularly limited thereto. Examples of the batch-type dry mixer include a high-speed mixer or a Henschel mixer of a high-speed mixing type, and a Nauter mixer or a sand mill of a medium-speed mixing type. By adding a metering feed device for the magnetoplumbite-type ferrite particles as the precursor and the phosphoric acid compound, the dry mixing may be carried out by a continuous treatment using a crusher such as a hammer mill and a pin mill. The phosphoric acid compound thus added may be adsorbed in and/or coated on the ferrite particles in the form of the phosphoric acid compound and/or phosphate ions such as pyrophosphate ions and metaphosphate ions.

The phosphoric acid compound to be mixed may be diluted with a solvent such as water, if required. In addition, after mixing the phosphoric acid compound with the ferrite particles, the resulting mixture may be subjected to drying, etc., if required.

Next, the resin composition for bonded magnet using the ferrite particles of the present invention is described.

The resin composition for bonded magnet according to the present invention can be produced by mixing and kneading the ferrite particles with an organic binder component and a silane coupling agent component such that the amount of the ferrite particles contained in the resin composition for bonded magnets is 70 to 95 parts by weight, the total amount of the organic binder component and the silane coupling agent component contained in the resin composition for bonded magnets is 30 to 5 parts by weight, and the phosphorus content in the resin composition for bonded magnets is 100 to 4000 mg/kg (0.010 to 0.4% by weight) in terms of P.

The phosphorus content in the resin composition for bonded magnets is preferably 120 to 3500 mg/kg (0.012 to 0.35% by weight) in terms of P.

The silicon content in the resin composition for bonded magnets is 1000 to 10000 mg/kg (0.10 to 1.00% by weight) in terms of $SiO_2$. When the silicon content is less than 1000 mg/kg, the compatibility between the ferrite particles and the organic binder component in the obtained resin composition tends to be deteriorated owing to the less amount of the silane coupling agent added, resulting in deteriorated fluidity thereof. When the silicon content is more than 10000 mg/kg, the effect of addition of silicon tends to be already saturated, and the addition of more than necessary amount of silicon tends to be meaningless. The silicon content in the resin composition for bonded magnets is preferably 1100 to 8000 mg/kg (0.11 to 0.80% by weight) and more preferably 1200 to 5000 mg/kg (0.12 to 0.50% by weight).

The organic binder used in the present invention is not particularly limited as long as it is used in conventional bonded magnets. The organic binder usable in the present invention may be appropriately selected from rubbers, vinyl chloride resins, ethylene-vinyl acetate copolymer resins, ethylene-ethyl acrylate copolymer resins, PPS resins, polyamide (nylon) resins, polyamide elastomers and polymeric aliphatic acid-based polyamides, depending upon the applications thereof. Among these organic binders, in the case where it is intended to preferentially achieve good strength and rigidity of the resultant molded product, the polyamide resins can be more suitably used. In addition, if required, a known mold release agent such as zinc stearate and calcium stearate may be added to the organic binder.

In the present invention, as the silane coupling agent, there may be used those silane coupling agents containing, as functional groups, any one of a vinyl group, an epoxy group, an amino group, a methacryl group and a mercapto group, as well as any one of a methoxy group and an ethoxy group. Among these silane coupling agents, preferred are those comprising an amino group and a methoxy group or those comprising an amino group and an ethoxy group.

The resin composition for bonded magnet according to the present invention has a residual magnetic flux density Br of preferably not less than 230 mT (2300 G) and more preferably not less than 235 mT (2350 G), a coercive force iHc of preferably 119 to 279 kA/m (1500 to 3500 Oe) and more preferably 127 to 259 kA/m (1600 to 3250 Oe), and a maximum energy product BHmax of preferably not less than 10.3 kJ/m$^3$ (1.30 MGOe) and more preferably not less than 10.7 kJ/m$^3$ (1.35 MGOe), as measured by the below-mentioned methods for measuring magnetic properties.

Next, the process for producing the resin composition for bonded magnet by using the ferrite particles, the resin binder and the silane coupling agent according to the present invention is described.

The resin composition for bonded magnet according to the present invention may be produced by any suitable known processes used for producing the conventional resin compositions for bonded magnet. For example, the silane coupling agent, if required, together with the phosphoric acids, etc., may be added to and uniformly mixed in the ferrite particles of the present invention and/or commercially available ferrite for bonded magnets, and then the organic binder component may be further uniformly mixed in the resultant mixture. Thereafter, the mixture is melted and kneaded using a kneading extruder, etc., and the resultant kneaded material is pulverized or cut into granules or pellets.

The amount of the silane coupling agent added is 0.15 to 3.5 parts by weight and preferably 0.2 to 3.0 parts by weight on the basis of 100 parts by weight of the ferrite particles of the present invention and/or commercially available ferrite for bonded magnets.

In the resin composition for bonded magnets according to the present invention, it is required to adjust the content of the phosphoric acid compound therein to the above-specified range. When using the ferrite particles which are not previously treated with the phosphoric acid compound, a predetermined amount of the phosphoric acid compound may be added thereto either before or during being mixed with the resin.

Next, the magnet roll of the present invention is described.

The magnet roll may be produced by the following method. That is, the ferrite particles for bonded magnet, the organic binder component, etc., are previously uniformly mixed with each other, and/or melted and kneaded after being mixed together, and then pulverized or cut into pellets to prepare a resin composition for bonded magnet. The resultant resin composition is injected while being kept in a molten state into a cavity of a metal mold in a magnetic field to magnetically orient the magnetic particles contained therein by a so-called magnetic field injection molding method, thereby obtaining a molded product constituted from a body portion of a cylindrical shape having a plurality of magnetic poles on a peripheral surface thereof, and shaft portions integrally formed on both end faces of the body portion. Meanwhile, the obtained molded product is in the form of an integral molded product including a barrel portion having a diameter of 17 mm and a length of 220 mm, and shaft portions each having a diameter of 5.4 mm which are formed on both end faces of the barrel portion (a center axis of each shaft portion is aligned with that of the barrel portion having a diameter of 17 mm).

<Function>

The reason why the ferrite-containing molded product produced from the ferrite particles and/or the resin composition for bonded magnets according to the present invention can exhibit excellent strength and magnetic properties, in particular, the molded product using the phosphoric acid compound that is free from decomposition and/or intramolecular dehydration at a temperature of 200 to 400° C. can be decreased in number of voids formed therein, is considered by the present inventors as follows, although not clearly determined yet.

That is, it is suggested that the ferrite particles of the present invention on the surface of which the phosphoric acid compound or phosphate ions are adsorbed or adhered can undergo deagglomeration between the particles and, therefore, can be improved in dispersibility.

Further, it is suggested that in the resin composition for bonded magnets according to the present invention, since the ferrite is improved in dispersibility by addition of the phosphoric acid compound or phosphate ions thereto, and since the reactivity between the organic binder component and the silane coupling agent is enhanced by incorporating the phosphoric acids in the ferrite, the compatibility between the three components, i.e., the ferrite, organic binder and silane coupling agent, can be synergistically improved.

Further, it is suggested that in the resin composition for bonded magnets according to the present invention, since the ferrite is improved in dispersibility by addition of the phosphoric acid compound or phosphate ions thereto, and since the reactivity between the organic binder component and the silane coupling agent is enhanced by incorporating the phosphoric acids in the ferrite, the compatibility between the three components, i.e., the ferrite, organic binder and silane coupling agent, can be synergistically improved.

As a result, the obtained resin composition can be improved in mechanical strength. In particular, by selecting, as the phosphoric acid compound, such a compound which is free from decomposition and/or intramolecular dehydration even when exposed to at least a temperature range of 200 to 320° C. and preferably to a temperature range of 200 to 400° C., the phosphoric acid compound can be prevented from suffering from decomposition and dehydration when kneaded or injection-molded, so that formation of voids in the magnet roll produced therefrom can be suitably suppressed.

EXAMPLES

The present invention is described in more detail below by Examples. However, these Examples are only illustrative and not intended to limit the present invention thereto unless departing from the scope of the present invention.

The average particle diameter of the ferrite particles according to the present invention was measured using a powder specific surface area measuring apparatus "SS-100" manufactured by Shimadzu Seisakusho Co., Ltd.

The BET specific surface area of the ferrite particles according to the present invention was measured using a 4 specimen fully-automatic specific surface area analyzer "4 Sorb U2" manufactured by Yuasa Ionics Co., Ltd.

The compressed density of the ferrite particles according to the present invention was determined as a density of the particles when compressing the particles under a pressure of 1 t/cm$^2$.

The pH value of the ferrite particles according to the present invention was measured using a glass electrode type hydrogen ion concentration meter "M8E" manufactured by Horiba Seisakusho Co., Ltd., according to JTS K5101-17-1.

The content of phosphorus (P) used in the present invention was determined by subjecting a solution prepared by dissolving the particles in an acid to the measurement using an inductively coupled plasma atomic emission spectroscopic apparatus "iCAP 6000 Series" manufactured by Thermoelectron Co., Ltd.

The content of silica ($SiO_2$) used in the present invention was determined in terms of content of an oxide ($SiO_2$) using a fluorescent X-ray analyzer "RIX2100" manufactured by Rigaku Denki Co., Ltd.

The saturation magnetization value us and coercive force Hc of the ferrite particles were measured under the condition of a maximum magnetic field of 1591 kA/m (20 kOe) using a sample vibration type magnetic flux meter "SSM-5-15" manufactured by Toei Kogyo Co., Ltd. The saturation magnetization value us was determined as the value obtained by extrapolating the measured value in the respective magnetic fields up to infinity of the magnetic field by $1/H^2$ plotting.

The melt mass flow rate (MFR) of the resin composition for bonded magnet was determined by melting the resin composition at 270° C. and measuring the MFR of the molten resin composition under a load of 10 kg, according to JIS K7210.

The molding density of a molded product produced from the resin composition for bonded magnets was determined as follows. That is, the resin composition for bonded magnet was melted in a cavity of a metal mold having a diameter of 25 mmφ and a height of 10.5 mm to mold a core, and the density of the core was measured using an electronic specific gravity meter "EW-120SG" manufactured by Yasuda Seiki Seisakusho Co., Ltd.

The water content in the resin composition for bonded magnet was measured using a trace water content analyzer "AQ-7" manufactured by Hiranuma Sangyo Co., Ltd., equipped with a water vaporization device "EV-6" manufactured by Hiranuma Sangyo Co., Ltd.

The magnetic properties of the resin composition for bonded magnet (including residual magnetic flux density Br, coercive force iHc, coercive force bHc and maximum energy product BHmax) were determined as follows. That is, the resin composition for bonded magnet was melted in a cavity of a metal mold having a diameter of 25 mmφ and a height of 10.5 mm and magnetically oriented in a magnetic field of 4 kOe, and then the magnetic properties of the molten resin composition were measured in a magnetic field of 14 kOe using a "D.C. magnetization characteristic automatic recorder 3257" manufactured by Yokogawa Hokushin Denki Co., Ltd.

The injection moldability of the resin composition for bonded magnet was evaluated as follows. That is, the resin composition was molded using an injection molding machine "110ELII" manufactured by Nippon Seikosho Co., Ltd., to produce an integrally molded magnet roll constituted from a barrel portion having a diameter of 17 mm and a length of 220 mm and shaft portions each having a diameter of 5.4 mm which were formed on both end faces of the barrel portion (a center axis of each shaft portion is aligned with that of the barrel portion having a diameter of 17 mm). The thus produced magnet roll was magnetized in the injection molding machine to form 4 magnetic poles S1, S2, N1 and N2 on the barrel portion, cooled in the metal mold set to 100° C. until the temperature of the surface of the magnet roll was reduced to about 130° C., and then taken out of the metal mold. The injection pressures upon injection-molding the magnet roll were recorded to evaluate the injection moldability of the resin composition.

The mechanical strength of the magnet roll was determined as follows. That is, within 5 sec after taking the magnet roll out of the mold, the magnet roll was dipped in water controlled to a temperature of 15° C. using a chiller, allowed to stand under the dipped condition for 1 hr, and then taken out of water. The thus treated magnet roll was then allowed to stand at a room temperature of 23° C. and a humidity of 53% for 24 hr, and then subjected to measurement of a three-point bending strength at a barrel portion thereof (i.e., a three-point bending test in which a pressure is applied to a center of a specimen held by setting a distance between the supports to 180 mm, at a rate of 50 mm/min) using an autograph "AG-1 Series" manufactured by Shimadzu Seisakusho Co, Ltd. The thus measured bending strength was regarded as the mechanical strength of the magnet roll.

The magnetic properties of the magnet roll were determined as follows. That is, the magnet roll was subjected to measurement of a magnetic flux density at a position spaced by a distance of 10 mm from a center axis thereof using a gauss meter "Model 19951 Gauss Meter" manufactured by Bell Corp., equipped with an axial probe "SAF99-1802" manufactured by Toyo Technica Co., Ltd.

The magnetic force of the magnet roll was determined as follow. That is, maximum magnetic flux densities of S1, S2, N1 and N2 were measured at a center of the barrel portion, and the magnetic force was determined as an average value of the measured magnetic flux densities of the four magnetic poles.

The uniformity of the surface magnetic force of the magnet roll was determined by the same method as described in Japanese Patent Application Laid-open (KOKAI) No. 10-340002 (1998). That is, the axial magnetic force on the S1 pole was measured in a central portion of the magnet roll extending over the range of 198 mm except for its end portions extending by a distance of 11 mm from each end thereof, at intervals of 1 mm, and the maximum value of change in magnetic flux density as measured at intervals of 1 mm was determined as the uniformity of surface magnetic force thereof.

The number of voids in the magnet roll was evaluated by the following procedure. That is, the magnet roll was cut along the direction parallel with an axial direction thereof using a 190 mm slide circular saw manufactured by Makita Co., Ltd., to measure a diameter of respective voids being present on both cut sections thereof using a scale. The measured diameters of the voids were classified into four categories (including less than 0.5 mm; not less than 0.5 mm and less than 3.0 mm; not less than 3.0 mm and less than 5.0 mm; and not less than 5.0 mm) to calculate the number of the voids in each category.

Example 1

Production of Ferrite Particles

The commercially available strontium ferrite particles (average particle diameter: 1.37 μm; BET specific surface area: 1.54 m$^2$/g; compressed density: 3420 kg/m$^3$ (3.42 g/cm$^3$); phosphorus content: 82 mg/kg; SiO$_2$ content: 640 mg/kg) were charged into a Henschel mixer, and a 850 phosphoric acid aqueous solution was added thereto in an amount of 2000 mg/kg (1700 mg/kg in terms of phosphoric acid) based on the weight of the ferrite, followed by mixing the resulting mixture for 10 min.

The thus obtained ferrite particles had an average particle diameter of 1.43 μm, a BET specific surface area of 1.64 m$^2$/g, a compressed density of 3390 kg/m$^3$ (3.39 g/cm$^3$), a pH value of 6.8, a phosphorus content of 620 mg/kg, and a SiO$_2$ content of 640 mg/kg.

Examples 2 to 5 and Comparative Examples 1 to 5

The same procedure as defined in Example 1 was conducted except that the composition, the kinds and amounts of additives added, etc., were changed variously, thereby producing ferrite particles.

The ferrite magnetic particles used are shown in Table 1, and production conditions and properties of the obtained ferrite magnetic particles for bonded magnets are shown in Table 2.

Example 6

Production of Resin Composition for Bonded Magnets 25000 g of the resultant ferrite particles were charged into a Henschel mixer, and an aminoalkyl-based silane coupling agent was added thereto in an amount of 0.4% by weight based on the weight of the ferrite particles and mixed with each other for 1 hr until a uniform mixture was obtained. In addition, 2727 g of a 6-nylon resin having a relative viscosity of 2.02 was charged into the resultant mixture and further mixed with each other for 1 hr, thereby preparing a mixture of a resin composition for bonded magnets.

The resultant mixture of the resin composition for bonded magnets was fed at a constant rate into a twin-screw kneader and kneaded therein at a temperature capable of melting the 6-nylon resin. The kneaded material was extruded from the kneader in the form of strands, and cut into pellets having a size of 2 mmφ×3 mm, thereby obtaining a resin composition for bonded magnets in the form of pellets.

Examples 7 to 10 and Comparative Examples 6 to 10

The same procedure as defined in Example 6 was conducted except that the kind of the ferrite particles used and the amounts of the 6-nylon resin and the silane coupling agent added were changed variously, thereby obtaining resin compositions for bonded magnets each comprising the ferrite particles, the 6-nylon resin and the silane coupling agent.

Production conditions and properties of the thus obtained resin compositions for bonded magnets are shown in Table 3.

Example 11

Molding of Magnet Roll

The thus obtained resin composition for bonded magnets was dried at 100° C. for 8 hr, melted at 300° C. in an injection molding machine, and injection-molded into a metal mold set to 100° C. for an injecting time of 1 sec, thereby preparing an integrally molded magnet roll constituted from a barrel portion having a diameter of 17 mm and a length of 220 mm and shaft portions formed on both end faces of the barrel portion which each had a diameter of 5.4 mm (a center axis of each shaft portion was aligned with that of the barrel portion having a diameter of 17 mm).

Examples 12 to 15 and Comparative Examples 11 to 15

The same procedure as defined in Example 11 was conducted except that various resin compositions for bonded magnets were used, thereby producing magnet rolls. Injection moldability and various properties of the obtained magnet rolls are shown in Table 4.

TABLE 1

| Kind of ferrite | Properties (before surface treatment) Magnetic properties | | | |
|---|---|---|---|---|
| | σs | | Hc | |
| | $Am^2/kg$ | emu/g | kA/m | Oe |
| Sr ferrite A | 72.1 | 72.1 | 261 | 3280 |
| Sr ferrite B | 72.5 | 72.5 | 263 | 3310 |
| Mixture of Sr ferrite B (99%) and Ba ferrite (1%) | 72.0 | 72.0 | 256 | 3220 |

| Kind of ferrite | Properties (before surface treatment) Other properties | | | | |
|---|---|---|---|---|---|
| | Ps (μm) | BET ($m^2/g$) | CD ($g/cm^3$) | Phosphorus content (mg/kg in terms of P) | Silica content (mg/kg in terms of $SiO_2$) |
| Sr ferrite A | 1.37 | 1.54 | 3.42 | 82 | 640 |
| Sr ferrite B | 1.27 | 1.72 | 3.36 | 84 | 560 |
| Mixture of Sr ferrite B (99%) and Ba ferrite (1%) | 1.35 | 1.61 | 3.37 | 80 | 620 |

TABLE 2

| Examples and Comparative Examples | Kind of ferrite | Production conditions Kind of phosphorus-based treating agent, etc., added | Amount of treating agent added Ratio to ferrite (mg/kg) |
|---|---|---|---|
| Example 1 | Sr ferrite A | Phosphoric acid (85% solution) | 2000 |
| Example 2 | Sr ferrite A | Phosphoric acid (85% solution) | 500 |
| Example 3 | Sr ferrite B | Phosphoric acid (85% solution) | 1000 |
| Example 4 | Sr ferrite A | Phosphoric acid (85% solution) | 3000 |
| Example 5 | Mixture of Sr ferrite B and Ba ferrite | Phosphoric acid (85% solution) | 4000 |
| Comparative Example 1 | Sr ferrite A | — | 0 |
| Comparative Example 2 | Sr ferrite B | — | 0 |
| Comparative Example 3 | Mixture of Sr ferrite B and Ba ferrite | — | 0 |
| Comparative Example 4 | Sr ferrite A | Nitric acid (60% solution) | 1900 |
| Comparative Example 5 | Sr ferrite A | Acetic acid (1 mol/L solution) | 3200 |

| Examples and Comparative Examples | Properties (after surface treatment) Magnetic properties | | | |
|---|---|---|---|---|
| | σs | | Hc | |
| | $Am^2/kg$ | emu/g | kA/m | Oe |
| Example 1 | 71.9 | 71.9 | 262 | 3290 |
| Example 2 | 72.1 | 72.1 | 261 | 3280 |
| Example 3 | 72.3 | 72.3 | 264 | 3320 |
| Example 4 | 71.5 | 71.5 | 261 | 3280 |
| Example 5 | 71.4 | 71.4 | 258 | 3240 |
| Comparative Example 1 | 72.1 | 72.1 | 261 | 3280 |
| Comparative Example 2 | 72.5 | 72.5 | 263 | 3310 |
| Comparative Example 3 | 72.0 | 72.0 | 256 | 3220 |

TABLE 2-continued

| | | | | |
|---|---|---|---|---|
| Comparative Example 4 | 71.8 | 71.8 | 261 | 3280 |
| Comparative Example 5 | 72.0 | 72.0 | 260 | 3270 |

| | Properties (after surface treatment) Other properties | | | | |
|---|---|---|---|---|---|
| Examples and Comparative Examples | Ps (μm) | BET ($m^2/g$) | CD ($g/cm^3$) | Phosphorus content (mg/kg in terms of P) | Silica content (mg/kg in terms of $SiO_2$) |
| Example 1 | 1.43 | 1.64 | 3.39 | 620 | 640 |
| Example 2 | 1.44 | 1.63 | 3.41 | 210 | 650 |
| Example 3 | 1.29 | 1.71 | 3.34 | 350 | 560 |
| Example 4 | 1.32 | 1.76 | 3.32 | 890 | 640 |
| Example 5 | 1.38 | 1.64 | 3.35 | 1170 | 610 |
| Comparative Example 1 | 1.37 | 1.54 | 3.42 | 82 | 640 |
| Comparative Example 2 | 1.27 | 1.72 | 3.36 | 84 | 560 |
| Comparative Example 3 | 1.35 | 1.61 | 3.37 | 80 | 620 |
| Comparative Example 4 | 1.42 | 1.65 | 3.39 | 81 | 620 |
| Comparative Example 5 | 1.43 | 1.58 | 3.38 | 82 | 640 |

TABLE 3

| | | Production conditions | | |
|---|---|---|---|---|
| Examples and Comparative Examples | Kind of ferrite | Amount of ferrite blended (g) | Amount of 6-nylon blended (g) | Amount of silane coupling agent added (ratio to ferrite; wt %) |
| Example 6 | Example 1 | 25000 | 2727 | 0.4 |
| Example 7 | Example 2 | 25000 | 2727 | 0.8 |
| Example 8 | Example 3 | 25000 | 2980 | 0.8 |
| Example 9 | Example 4 | 25000 | 2727 | 0.6 |
| Example 10 | Example 5 | 25000 | 2915 | 0.8 |
| Comparative Example 6 | Comparative Example 1 | 25000 | 2915 | 0.8 |
| Comparative Example 7 | Comparative Example 2 | 25000 | 2915 | 0.4 |
| Comparative Example 8 | Comparative Example 3 | 25000 | 2727 | 0.4 |
| Comparative Example 9 | Comparative Example 4 | 25000 | 2727 | 0.6 |
| Comparative Example 10 | Comparative Example 5 | 25000 | 2727 | 0.6 |

| Examples and Comparative Examples | Properties | | | | |
|---|---|---|---|---|---|
| | MFR (g/10 min) | Molding density ($g/cm^3$) | Water content (ppm) | Br (mT) | Br (G) |
| Example 6 | 54 | 3.77 | 178 | 291 | 2910 |
| Example 7 | 55 | 3.73 | 78 | 287 | 2870 |
| Example 8 | 69 | 3.68 | 195 | 281 | 2810 |
| Example 9 | 52 | 3.75 | 249 | 283 | 2830 |
| Example 10 | 42 | 3.78 | 85 | 289 | 2890 |
| Comparative Example 6 | 60 | 3.75 | 191 | 288 | 2880 |
| Comparative Example 7 | 61 | 3.74 | 145 | 288 | 2880 |
| Comparative Example 8 | 50 | 3.78 | 170 | 292 | 2920 |
| Comparative Example 9 | 21 | 3.74 | 52 | 251 | 2510 |
| Comparative Example 10 | 70 | 3.73 | 86 | 291 | 2910 |

TABLE 3-continued

| Examples and Comparative Examples | Properties | | | |
|---|---|---|---|---|
| | bHc (kA/m) | bHc (Oe) | iHc (kA/m) | iHc (Oe) |
| Example 6 | 169.5 | 2130 | 188.6 | 2370 |
| Example 7 | 167.9 | 2110 | 187.8 | 2360 |
| Example 8 | 188.6 | 2370 | 207.7 | 2610 |
| Example 9 | 178.3 | 2240 | 203.7 | 2560 |
| Example 10 | 171.1 | 2150 | 190.2 | 2390 |
| Comparative Example 6 | 170.3 | 2140 | 192.6 | 2420 |
| Comparative Example 7 | 176.7 | 2220 | 203.7 | 2560 |
| Comparative Example 8 | 175.9 | 2210 | 199.7 | 2510 |
| Comparative Example 9 | 160.0 | 2010 | 192.6 | 2420 |
| Comparative Example 10 | 179.8 | 2260 | 190.2 | 2390 |

| Examples and Comparative Examples | Properties | | | |
|---|---|---|---|---|
| | BHmax (kJ/m³) | BHmax (MGOe) | Phosphorus content (mg/kg in terms of P) | Silica content (mg/kg in terms of $SiO_2$) |
| Example 6 | 16.55 | 2.08 | 560 | 1900 |
| Example 7 | 16.15 | 2.03 | 190 | 3000 |
| Example 8 | 15.52 | 1.95 | 310 | 3100 |
| Example 9 | 15.60 | 1.96 | 820 | 2400 |
| Example 10 | 16.23 | 2.04 | 1060 | 3100 |
| Comparative Example 6 | 16.15 | 2.03 | 74 | 2900 |
| Comparative Example 7 | 16.23 | 2.04 | 72 | 1800 |
| Comparative Example 8 | 16.71 | 2.10 | 72 | 1900 |
| Comparative Example 9 | 11.86 | 1.49 | 73 | 2400 |
| Comparative Example 10 | 16.63 | 2.09 | 74 | 2500 |

TABLE 4

| Examples and Comparative Examples | Kind of compound (bonded magnet composition) | Injection property Injection pressure (MPa) |
|---|---|---|
| Example 11 | Example 6 | 149 |
| Example 12 | Example 7 | 160 |
| Example 13 | Example 8 | 137 |
| Example 14 | Example 9 | 187 |
| Example 15 | Example 10 | 176 |
| Comparative Example 11 | Comparative Example 6 | 192 |
| Comparative Example 12 | Comparative Example 7 | 170 |
| Comparative Example 13 | Comparative Example 8 | 199 |
| Comparative Example 14 | Comparative Example 9 | 152 |
| Comparative Example 15 | Comparative Example 10 | 80 |

| Examples and Comparative Examples | Properties | | |
|---|---|---|---|
| | Magnetic force (mT) | Magnetic force (G) | Surface uniformity (mT) |
| Example 11 | 88.6 | 886 | 0.45 |
| Example 12 | 88.2 | 882 | 0.32 |
| Example 13 | 85.2 | 852 | 0.40 |
| Example 14 | 84.9 | 849 | 0.50 |
| Example 15 | 86.6 | 866 | 0.49 |
| Comparative Example 11 | 87.6 | 876 | 0.67 |
| Comparative Example 12 | 87.7 | 877 | 0.72 |
| Comparative Example 13 | 87.8 | 878 | 0.45 |
| Comparative Example 14 | 81.0 | 810 | 0.60 |
| Comparative Example 15 | Not removable from a metal mold owing to lack of strength of molded product and poor peeling-off (impossible to retain its shape) | | |

| Examples and Comparative Examples | Properties | | |
|---|---|---|---|
| | Surface uniformity (G) | Surface uniformity/ magnetic force (%) | Bending strength (N) |
| Example 11 | 4.5 | 0.51 | 1170 |
| Example 12 | 3.2 | 0.36 | 1503 |
| Example 13 | 4.0 | 0.47 | 866 |
| Example 14 | 5.0 | 0.59 | 1114 |
| Example 15 | 4.9 | 0.57 | 1154 |
| Comparative Example 11 | 6.7 | 0.76 | 413 |
| Comparative Example 12 | 7.2 | 0.82 | 212 |
| Comparative Example 13 | 4.5 | 0.51 | 399 |

TABLE 4-continued

| | | | |
|---|---|---|---|
| Comparative Example 14 | 6.0 | 0.74 | 640 |
| Comparative Example 15 | Not removable from a metal mold owing to lack of strength of molded product and poor peeling-off (impossible to retain its shape) | | |

Thus, it was confirmed that the magnet roll of the present invention had a strength of not less than 500 N, a magnetic force of not less than 800 G (not less than 80 mT), and a uniformity of surface magnetic force (maximum value of change in magnetic flux density as measured at intervals of 1 mm) of not more than 0.70%, and were, therefore, excellent in properties, in particular, uniformity of surface magnetic force and mechanical strength, as compared to those obtained in Comparative Examples.

Example 16

Production of Ferrite Particles

The commercially available strontium ferrite particles (average particle diameter: 1.52 μl; BET specific surface area: 1.38 m$^2$/g; compressed density: 3410 kg/m$^3$ (3.41 g/cm$^3$); phosphorus content: 83 mg/kg; SiO$_2$ content: 615 mg/kg) were charged into a Henschel mixer, and sodium pyrophosphate was added thereto in an amount of 500 mg/kg based on the weight of the ferrite, followed by mixing the resulting mixture for 10 min.

The thus obtained ferrite particles had an average particle diameter of 1.59 μm, a BET specific surface area of 1.31 m$^2$/g, a compressed density of 3380 kg/m$^3$ (3.38 g/cm$^3$), a phosphorus content of 210 mg/kg, and a SiO$_2$ content of 615 mg/kg.

Examples 17 to 20

The same procedure as defined in Example 16 was conducted except that the composition, the kinds and amounts of additives added, etc., were changed variously, thereby producing ferrite particles. The ferrite magnetic particles used are shown in Table 5, and production conditions and properties of the obtained ferrite magnetic particles for bonded magnets are shown in Table 6.

Example 21

Production of Resin Composition for Bonded Magnets 25000 g of the resultant ferrite particles obtained in Examples 16 to 20 were charged into a Henschel mixer, and an aminoalkyl-based silane coupling agent was added thereto in an amount of 0.3% by weight based on the weight of the ferrite and mixed with each other for 1 hr until a uniform mixture was obtained. In addition, 2915 g of a 6-nylon resin having a relative viscosity of 2.02 was charged into the resultant mixture and further mixed with each other for 1 hr, thereby preparing a mixture of a resin composition for bonded magnets.

The resultant mixture of the resin composition for bonded magnets was fed at a constant rate into a twin-screw kneader and kneaded therein at a temperature capable of melting the 6-nylon resin. The kneaded material was extruded from the kneader in the form of strands, and cut into pellets having a size of 2 mmϕ×3 mm, thereby obtaining a resin composition for bonded magnets in the form of pellets.

Examples 22 to 25

The same procedure as defined in Example 21 was conducted except that the kind of the ferrite particles used and the amounts of the 6-nylon resin and the silane coupling agent added were changed variously, thereby obtaining resin compositions for bonded magnets each comprising the ferrite particles, the 6-nylon resin and the silane coupling agent. Production conditions and properties of the thus obtained resin compositions for bonded magnets are shown in Table 7.

Example 26

Molding of Magnet Roll

The respective resin compositions for bonded magnets obtained in Examples 21 to 25 were dried at 100° C. for 8 hr, melted at 315° C. in an injection molding machine, and injection-molded into a metal mold set to 100° C. for an injecting time of 1 sec, thereby preparing an integrally molded magnet roll constituted from a barrel portion having a diameter of 17 mm and a length of 220 mm and shaft portions formed on both end faces of the barrel portion which each had a diameter of 5.4 mm (a center axis of each shaft portion was aligned with that of the barrel portion having a diameter of 17 mm).

Examples 27 to 30

The same procedure as defined in Example 26 was conducted except that various resin compositions for bonded magnets were used, thereby producing magnet rolls. Injection moldability and various properties of the obtained magnet rolls are shown in Table 8.

TABLE 5

| | Properties (before surface treatment) | | | |
|---|---|---|---|---|
| | Magnetic properties | | | |
| | σs | | Hc | |
| Kind of ferrite | Am$^2$/kg | emu/g | kA/m | Oe |
| Sr ferrite A | 72.5 | 72.5 | 217.8 | 2730 |
| Sr ferrite B | 72.3 | 72.3 | 232.9 | 2920 |
| Mixture of Sr ferrite B (99%) and Ba ferrite (1%) | 72.1 | 72.1 | 228.1 | 2860 |

TABLE 5-continued

| | Properties (before surface treatment) Other properties | | | | |
|---|---|---|---|---|---|
| Kind of ferrite | Ps (μm) | BET (m²/g) | CD (g/cm³) | Phosphorus content (mg/kg in terms of P) | Silica content (mg/kg in terms of SiO₂) |
| Sr ferrite A | 1.52 | 1.38 | 3.41 | 83 | 615 |
| Sr ferrite B | 1.21 | 1.83 | 3.37 | 81 | 570 |
| Mixture of Sr ferrite B (99%) and Ba ferrite (1%) | 1.28 | 1.74 | 3.36 | 85 | 580 |

TABLE 6

| | | Production conditions | |
|---|---|---|---|
| Examples and Comparative Examples | Kind of ferrite | Kind of phosphorus-based treating agent, etc., added | Amount of treating agent added Ratio to ferrite (mg/kg) |
| Example 16 | Sr ferrite A | Sodium pyrophosphate | 500 |
| Example 17 | Sr ferrite A | Pyrophosphoric acid | 200 |
| Example 18 | Sr ferrite B | Sodium pyrophosphate | 1000 |
| Example 19 | Sr ferrite A | Sodium hexametaphosphate | 1000 |
| Example 20 | Mixture of Sr ferrite B and Ba ferrite | Metapnospnoric acid | 4000 |

| | Properties (after surface treatment) Other properties | | | | |
|---|---|---|---|---|---|
| Examples and Comparative Examples | Ps (μm) | BET (m²/g) | CD (g/cm³) | Phosphorus content (mg/kg in terms of P) | Silica content (mg/kg in terms of SiO₂) |
| Example 16 | 1.59 | 1.31 | 3.38 | 210 | 615 |
| Example 17 | 1.54 | 1.35 | 3.39 | 140 | 615 |
| Example 18 | 1.30 | 1.71 | 3.34 | 310 | 570 |
| Example 19 | 1.67 | 1.24 | 3.38 | 390 | 620 |
| Example 20 | 1.57 | 1.34 | 3.33 | 1610 | 575 |

TABLE 7

| | | Production conditions | | |
|---|---|---|---|---|
| Examples and Comparative Examples | Kind of ferrite | Amount of ferrite blended (g) | Amount of 6-nylon blended (g) | Amount of silane coupling agent added (ratio to ferrite; wt %) |
| Example 21 | Example 16 | 25000 | 2915 | 0.3 |
| Example 22 | Example 17 | 25000 | 2980 | 0.6 |
| Example 23 | Example 18 | 25000 | 2915 | 0.8 |
| Example 24 | Example 19 | 25000 | 2727 | 0.6 |
| Example 25 | Example 20 | 25000 | 2915 | 0.5 |

| Examples and Comparative Examples | Properties | | | | |
|---|---|---|---|---|---|
| | MFR (g/10 min) | Molding density (g/cm³) | Water content (ppm) | Br (mT) | Br (G) |
| Example 21 | 32 | 3.69 | 28 | 286 | 2860 |
| Example 22 | 48 | 3.67 | 36 | 283 | 2830 |
| Example 23 | 81 | 3.67 | 43 | 279 | 2790 |
| Example 24 | 54 | 3.74 | 41 | 291 | 2910 |
| Example 25 | 62 | 3.68 | 78 | 280 | 2800 |

TABLE 7-continued

| Examples and Comparative Examples | Properties | | | |
|---|---|---|---|---|
| | bHc (kA/m) | bHc (Oe) | iHc (kA/m) | iHc (Oe) |
| Example 21 | 178.3 | 2240 | 202.9 | 2550 |
| Example 22 | 179.8 | 2260 | 204.5 | 2570 |
| Example 23 | 183.8 | 2310 | 218.0 | 2740 |
| Example 24 | 177.5 | 2230 | 198.1 | 2490 |
| Example 25 | 182.2 | 2290 | 216.5 | 2720 |

| Examples and Comparative Examples | Properties | | | |
|---|---|---|---|---|
| | BHmax (kJ/m$^3$) | BHmax (MGOe) | Phosphorus content (mg/kg in terms of P) | Silica content (mg/kg in terms of SiO$_2$) |
| Example 21 | 15.92 | 2.00 | 190 | 1520 |
| Example 22 | 15.92 | 2.00 | 120 | 2310 |
| Example 23 | 15.20 | 1.91 | 270 | 2760 |
| Example 24 | 16.47 | 2.07 | 350 | 1830 |
| Example 25 | 15.28 | 1.92 | 1440 | 1530 |

TABLE 8

| Examples and Comparative Examples | Kind of compound (bonded magnet composition) | Injection property Injection pressure (MPa) |
|---|---|---|
| Example 26 | Example 21 | 149 |
| Example 27 | Example 22 | 155 |
| Example 28 | Example 23 | 157 |
| Example 29 | Example 24 | 170 |
| Example 30 | Example 25 | 138 |

| Examples and Comparative Examples | Properties | | |
|---|---|---|---|
| | Magnetic force (mT) | Magnetic force (G) | Surface uniformity (mT) |
| Example 26 | 84.6 | 846 | 0.34 |
| Example 27 | 85.4 | 854 | 0.41 |
| Example 28 | 85.0 | 850 | 0.32 |
| Example 29 | 85.3 | 853 | 0.46 |
| Example 30 | 86.6 | 866 | 0.42 |

| Examples and Comparative Examples | Properties | | |
|---|---|---|---|
| | Surface uniformity (G) | Surface uniformity/ magnetic force (%) | Bending strength (N) |
| Example 26 | 3.4 | 0.40 | 1330 |
| Example 27 | 4.1 | 0.48 | 1070 |
| Example 28 | 3.2 | 0.38 | 1160 |
| Example 29 | 4.6 | 0.54 | 980 |
| Example 30 | 4.2 | 0.48 | 910 |

| Examples and Comparative Examples | Properties Voids (number) | | | |
|---|---|---|---|---|
| | Less than 0.5 mm | Not less than 0.5 mm and less than 3.0 mm | Not less than 3.0 mm and less than 5.0 mm | Not less than 5.0 mm |
| Example 26 | 35 | 148 | 9 | 0 |
| Example 27 | 25 | 136 | 13 | 0 |
| Example 28 | 32 | 132 | 11 | 0 |
| Example 29 | 28 | 162 | 7 | 0 |
| Example 30 | 29 | 129 | 15 | 0 |

Thus, it was confirmed that the magnet rolls obtained in Examples 26 to 30 respectively had a strength of not less than 500 N as measured after being cooled in 15° C. water by the above method, a magnetic force of not less than 800 G (not less than 80 mT), and a uniformity of surface magnetic force (maximum value of change in magnetic flux density as measured at intervals of 1 mm) of not more than 0.70%. In particular, it was confirmed that the magnet rolls not only exhibited an excellent mechanical strength even when exposed to a high melting temperature and a high molding temperature, and a less number of voids having a large size (not less than 3.0 mm) which would cause deterioration in mechanical strength thereof, but also were excellent in uniformity of surface magnetic force as compared to Comparative Examples.

Therefore, when using the phosphoric acid compound that is free from decomposition and/or intramolecular dehydration even when exposed to a temperature range of 200 to 400° C., it is possible to produce a molded product such as a magnet roll at a higher temperature and improve a productivity thereof owing to an excellent fluidity upon molding.

In the foregoing, although the present invention is explained in more detail by Examples, the numeral ranges as defined in the present invention are necessarily intended to involve all of the ranges using the optional numeral value described in any of the above Examples as a critical value unless departing from the scope of the present invention, and it should be construed that all of them are described in the present specification.

INDUSTRIAL APPLICABILITY

Since the bonded magnet obtained by using the ferrite particles and/or the resin composition for bonded magnets according to the present invention are excellent in both quenching resistance (bending strength upon quenching) and magnetic properties (uniformity of magnetic force), the ferrite particles and/or the resin composition according to the present invention are suitable as ferrite particles and/or a resin composition for bonded magnets, in particular, for a magnet roll.

The invention claimed is:
1. A resin composition for a bonded magnet, comprising an organic binder component and magnetoplumbite-type ferrite magnetic particles for bonded magnets in which the magnetic particles are coated with a coating agent consisting of a phosphorus compound and a silane coupling agent, a content of the magnetic particles in the resin composition for bonded magnets being 70 to 95% by weight based on the weight of the resin composition;

a content of the phosphorus compound in the resin composition being 100 to 1060 mg/kg (0.010 to 0.1060% by weight) in terms of P wherein the phosphorus compound is selected from orthophosphoric acid, pyrophosphoric acid, metaphosphoric acid, triphosphoric acid and tetraphosphoric acid; and a content of silicon in the resin composition being 1000 to 10000 mg/kg (0.10 to 1.0% by weight) in terms of $SiO_2$.

2. The resin composition for a bonded magnet of claim 1, wherein the magnetoplumbite-type ferrite particles are Sr-based ferrite particles, Ba-based ferrite particles or a mixture thereof.

3. The resin composition for a bonded magnet of claim 1, wherein the BET specific surface area value of the ferrite particles is 1.0 to 3.0 $m^2/g$.

4. The resin composition for a bonded magnet of claim 1, wherein the coercive force Hc of the ferrite particles is 135 to 279 kA/m (1700 to 3500 Oe).

5. A resin composition for a bonded magnet, comprising an organic binder component and magnetoplumbite-type ferrite particles for bonded magnets in which the magnetic particles are coated with a coating agent consisting of a phosphorus compound and a silane coupling agent, a content of the magnetic particles in the resin composition for bonded magnets being 70 to 95% by weight based on the weight of the resin composition;

a content of the phosphorus in the resin composition being 100 to 1060 mg/kg (0.010 to 0.1060% by weight) in terms of P wherein the phosphorus compound is selected from sodium pyrophosphate, sodium metaphosphate, potassium metaphosphate and sodium hexametaphosphate; and a content of silicon in the resin composition being 1000 to 10000 mg/kg (0.10 to 1.0% by weight) in terms of $SiO_2$.

6. The resin composition for a bonded magnets of claim 5, wherein the magnetoplumbite-type ferrite particles are Sr-based ferrite particles, Ba-based ferrite particles or a mixture thereof.

7. The resin composition for a bonded magnets of claim 5, wherein the BET specific surface area value of the ferrite particles is 1.0 to 3.0 $m^2/g$.

8. The resin composition for a bonded magnets of claim 5, wherein the coercive force Hc of the ferrite particles is 135 to 279 kA/m (1700 to 3500 Oe).

9. The resin composition for a bonded magnet of claim 5, having a bending strength of a molded product comprising the resin composition of 980 N or more.

\* \* \* \* \*